United States Patent
Rodriguez (10) Patent No.: US 11,842,573 B1
(45) Date of Patent: Dec. 12, 2023

(54) METHODS AND SYSTEMS FOR ENHANCING LIVENESS DETECTION OF IMAGE DATA

(71) Applicant: Raphael A. Rodriguez, Marco Island, FL (US)

(72) Inventor: Raphael A. Rodriguez, Marco Island, FL (US)

( * ) Notice: Subject to any disclaimer, the term of this patent is extended or adjusted under 35 U.S.C. 154(b) by 0 days.

(21) Appl. No.: 18/356,791

(22) Filed: Jul. 21, 2023

(51) Int. Cl.
*G06K 9/00* (2022.01)
*G06V 40/40* (2022.01)
*G06F 21/32* (2013.01)
*G06V 10/74* (2022.01)

(52) U.S. Cl.
CPC .............. *G06V 40/40* (2022.01); *G06F 21/32* (2013.01); *G06V 10/761* (2022.01)

(58) Field of Classification Search
None
See application file for complete search history.

(56) References Cited

U.S. PATENT DOCUMENTS

| 10,354,158 | B2 * | 7/2019 | Zhou | G06V 40/67 |
| 2008/0025579 | A1 * | 1/2008 | Sidlauskas | G06V 10/143 |
| | | | | 382/192 |
| 2020/0134344 | A1 * | 4/2020 | Joshi | G06T 5/10 |
| 2022/0406091 | A1 * | 12/2022 | Wasnik | G06V 40/171 |

OTHER PUBLICATIONS

Chen et al., "Face anti-spoofing by fusing high and low frequency features for advanced generalization capability" (Year: 2020).*
Ai et al., "Face swapping detection based on identity spatial constraints with weighted frequency division" (Year: 2022).*
Jourabloo et al., "Face de-spoofing: anti-spoofing via noise modeling" (Year: 2018).*

* cited by examiner

*Primary Examiner* — Soo Jin Park
(74) *Attorney, Agent, or Firm* — Kevin McDermott, Esq.

(57) ABSTRACT

A method for enhancing liveness detection of image data is provided that includes receiving image data of a person and using multi-resolution convolution and octave convolution techniques to extract first and second frequency components from the received image data. The method also includes comparing the first frequency component against data in a first frequency map and comparing the second frequency component against data in a second frequency map. Furthermore, the method includes determining whether the first frequency component satisfies matching criteria with data in the first frequency map and determining whether the second frequency component satisfies matching criteria with data in the second frequency map. In response to determining the first and second frequency components fail to satisfy the data in the respective frequency map, the method concludes that the received image data was not taken of a live person.

16 Claims, 5 Drawing Sheets

48

| FREQUENCY COMPONENTS (50) | REGIONS OF INTEREST (52) | SPATIAL FREQUENCY RANGES (54) |
|---|---|---|
| 1 | EYES | R1 |
| 2 | NOSE | R2 |
| 3 | MOUTH | R3 |
| 4 | FOREHEAD | R4 |
| 5 | CHEEKS | R5 |

| FREQUENCY COMPONENTS | REGIONS OF INTEREST | SPATIAL FREQUENCY RANGES |
|---|---|---|
| 1 | EYES | R1 |
| 2 | NOSE | R2 |
| 3 | MOUTH | R3 |
| 4 | FOREHEAD | R4 |
| 5 | CHEEKS | R5 |

METHODS AND SYSTEMS FOR ENHANCING LIVENESS DETECTION OF IMAGE DATA

BACKGROUND OF THE INVENTION

This invention relates generally to biometric authentication, and more particularly, to methods and systems for enhancing liveness detection of image data.

Individuals conduct transactions with many different service providers in person and remotely over the Internet. Network-based transactions conducted over the Internet may involve, for example, opening a bank account or similar account using a website or mobile application. Service providers typically require successfully identifying an individual before he or she is permitted to open a bank account or conduct any other type of network-based transaction involving sensitive information.

Service providers typically require individuals to upload an image of his or her identity document, like a driver's license or a passport, and a claim of identity to facilitate authentication. The uploaded images are typically analyzed to determine whether the identity document in the uploaded image is authentic, not tampered with, jurisdictionally accurate, and unexpired. The analysis may be manual or automatic.

Impostors currently use many methods to obtain or create fraudulent biometric data of others that can be submitted during authentication transactions. For facial biometric data imposters have been known to obtain two-dimensional pictures of others, from social networking sites such as Facebook, which can be presented to a camera during authentication to support a false claim of identity. Moreover, imposters have been known to eavesdrop on networks during legitimate network-based biometric authentication transactions to surreptitiously obtain genuine biometric data of users. The imposters then use the obtained biometric data for playback during fraudulent network-based authentication transactions. Such fraudulent biometric data are known to be difficult to detect using known liveness detection methods.

Consequently, accurately conducting network-based biometric authentication transactions with biometric data obtained of a user at a remote location depends on verifying the physical presence of the user during the authentication transaction as well as accurately verifying the identity of the user with the obtained biometric data. Verifying that the biometric data presented during a network-based biometric authentication transaction conducted at a remote location is from a live person at the remote location, is known as liveness detection or anti-spoofing.

Liveness detection methods have been known to use structure derived from motion of a biometric modality, such as a person's face, to distinguish a live person from a photograph. Other methods have been known to analyze sequential images of eyes to detect eye blinks and thus determine if an image of a face is from a live person. Yet other known methods have been known to illuminate a biometric modality with a pattern to distinguish a live person from a photograph. However, these known methods may not be convenient and may not accurately detect spoofing. As a result, these known methods may not provide high confidence liveness detection support for service providers dependent upon accurate biometric authentication transaction results.

Thus, it would be advantageous and an improvement over the relevant technology to provide a method and an electronic device capable of conveniently and accurately detecting fraudulent image data during authentication transactions.

BRIEF DESCRIPTION OF THE INVENTION

A method for enhancing liveness detection of image data is provided that includes receiving, by an electronic device, image data of a person, and using multi-resolution convolution and octave convolution techniques to extract first and second frequency components from the received image data. The first and second frequency components correspond to different spatial frequency ranges. Moreover, the method includes comparing the first frequency component against data in a first frequency map, wherein the first frequency map is generated from genuine image data of the person and the data includes the same spatial frequency range as the first frequency component. Furthermore, the method includes comparing the second frequency component against data in a second frequency map, wherein the second frequency map is generated from genuine image data of the person and has the same spatial frequency range as the second frequency component. The method also includes determining whether the first frequency component satisfies matching criteria with data in the first frequency map and determining whether the second frequency component satisfies matching criteria with data in the second frequency map. In response to determining neither the first nor the second frequency component satisfies the data in the respective frequency map, the method concludes the received image data was not taken of a live person.

In one embodiment of the present disclosure the method concludes that the received image data was taken of a live person in response to determining at least one of the first and second frequency components satisfies the data in the respective frequency map.

In another embodiment of the present disclosure the step of determining whether the first and second frequency components satisfy matching criteria in the respective frequency map includes calculating a similarity score for the comparison of the first frequency component against the first frequency map and a similarity score for the comparison of the second frequency component against the second frequency map. Moreover, the determining step includes comparing each similarity score against a threshold value and determining at least one of the first and second frequency components satisfies the data in the respective frequency map when the corresponding similarity score satisfies the threshold value.

In yet another embodiment of the present disclosure the method includes combining the first and second frequency components to create a collective frequency component, comparing the collective frequency component against a collective frequency map created from the first and second frequency maps, and calculating a collective similarity score based on the comparisons. The method also includes determining whether the first frequency component, the second frequency component, and the collective frequency components satisfy a threshold value. In response to determining that at least two of the first frequency component, the second frequency component and the collective frequency component satisfy the threshold value, the method concludes the received image data was taken of a live person.

In yet another embodiment of the present disclosure the method includes concluding the received image data was not taken of a live person in response to determining that at least two of the first frequency component, the second frequency component and the collective frequency component fail to satisfy the threshold value.

In yet another embodiment of the present disclosure the method includes determining that at least one region of interest is in the received image data, the at least one region of interest being in the first frequency component only.

In yet another embodiment of the present disclosure the step of comparing the first and second frequency components against data in the first and second frequency maps includes comparing the at least one region of interest against a corresponding at least one region of interest in the first frequency map.

In yet another embodiment of the present disclosure the step of determining whether the first and second frequency components satisfy the data in the respective frequency map includes determining the received image data includes at least one region of interest, where the at least one region of interest is included in the first and second frequency components. Moreover, the step of determining whether the first and second frequency components satisfy the data in the respective frequency map includes comparing the at least one region of interest in the first frequency component against a corresponding region of interest in the first frequency map and comparing the at least one region of interest in the second frequency component against a corresponding region of interest in the second frequency map.

In yet another embodiment of the present disclosure, the extracting step includes extracting the first frequency components from the received image data using a high pass filter and extracting the second frequency components from the received image data using a low pass filter.

Another aspect of the present disclosure provides an electronic device for enhancing liveness detection of image data including a processor and a memory configured to store data. The electronic device is associated with a network and the memory is in communication with the processor and has instructions stored thereon which, when read and executed by the processor, cause the electronic device to receive image data of a person, and use multi-resolution convolution and octave convolution techniques to extract first and second frequency components from the received image data. The first and second frequency components correspond to different spatial frequency ranges. Moreover, the instructions when read and executed by the processor, cause the electronic device to compare the first frequency component against data in a first frequency map, where the first frequency map is generated from genuine image data of the person and the data includes the same spatial frequency range as the first frequency component. Furthermore, the instructions when read and executed by the processor, cause the electronic device to compare the second frequency component against data in a second frequency map, where the second frequency map is generated from genuine image data of the person and the data includes the same spatial frequency range as the second frequency component. Additionally, the instructions when read and executed by the processor, cause the electronic device to determine whether the first frequency component satisfies matching criteria with data in the first frequency map and determine whether the second frequency component satisfies matching criteria with data in the second frequency map. In response to determining the first and second frequency component fail to satisfy the data in the respective frequency map, the instructions when read and executed by the processor, cause the electronic device to conclude the received image data was not taken of a live person.

In one embodiment of the present disclosure, the instructions when read and executed by the processor, cause the electronic device to conclude the received image data was taken of a live person in response to determining at least one of the first and second frequency components satisfies the data in the respective frequency maps.

In another embodiment of the present disclosure, the instructions when read and executed by the processor, cause the electronic device to calculate a similarity score for the comparison of the first frequency component against the first frequency map and a similarity score for the comparison of the second frequency component against the second frequency map. Moreover, the instructions when read and executed by the processor, cause the electronic device to compare each similarity score against a threshold value, and determine at least one of the first and second frequency components satisfies the data in the respective frequency map when the corresponding similarity score satisfies the threshold value.

In yet another embodiment of the present disclosure, the instructions when read and executed by the processor, cause the electronic device to combine the first and second frequency components to create a collective frequency component, compare the collective frequency component against a collective frequency map created from the first and second frequency maps, and calculate a collective similarity score based on the collective frequency component and collective frequency map comparison. Moreover the instructions when read and executed by the processor, cause the electronic device to determine whether the first frequency component, the second frequency component, and the collective frequency components satisfy a threshold value, and in response to determining that at least two of the first frequency component, the second frequency component and the collective frequency component satisfy the threshold value, conclude the received image data was taken of a live person.

In yet another embodiment of the present disclosure, the instructions when read and executed by the processor, cause the electronic device to conclude the received image data was not taken of a live person in response to determining that at least two of the first, second and collective frequency components fail to satisfy the threshold value.

In yet another embodiment of the present disclosure, the instructions when read and executed by the processor, cause the electronic device to determine that at least one region of interest is in the received image data. The at least one region of interest is in the first frequency component only.

In yet another embodiment of the present disclosure, the instructions when read and executed by the processor, cause the electronic device to compare the at least one region of interest against a corresponding at least one region of interest in the first frequency map.

In yet another embodiment of the present disclosure, the instructions when read and executed by the processor, cause the electronic device to determine the received image data includes at least one region of interest. The region of interest is included in the first and second frequency components. Moreover, the instructions when read and executed by the processor, cause the electronic device to compare the at least one region of interest in the first frequency component against a corresponding region of interest in the first frequency map, and compare the at least one region of interest in the second frequency component against a corresponding region of interest in the second frequency map.

In yet another embodiment of the present disclosure, the instructions when read and executed by the processor, cause the electronic device to extract the first frequency components from the received image data using a high pass filter, and extract the second frequency components from the received image data using a low pass filter.

DETAILED DESCRIPTION OF THE INVENTION

The following detailed description is made with reference to the accompanying drawings and is provided to assist in a comprehensive understanding of various example embodiments of the present disclosure. The following description includes various details to assist in that understanding, but these are to be regarded merely as examples and not for the purpose of limiting the present disclosure as defined by the appended claims and their equivalents. The words and phrases used in the following description are merely used to enable a clear and consistent understanding of the present disclosure. In addition, descriptions of well-known structures, functions, and configurations may have been omitted for clarity and conciseness. Those of ordinary skill in the art will recognize that various changes and modifications of the example embodiments described herein can be made without departing from the spirit and scope of the present disclosure.

Figure 1:
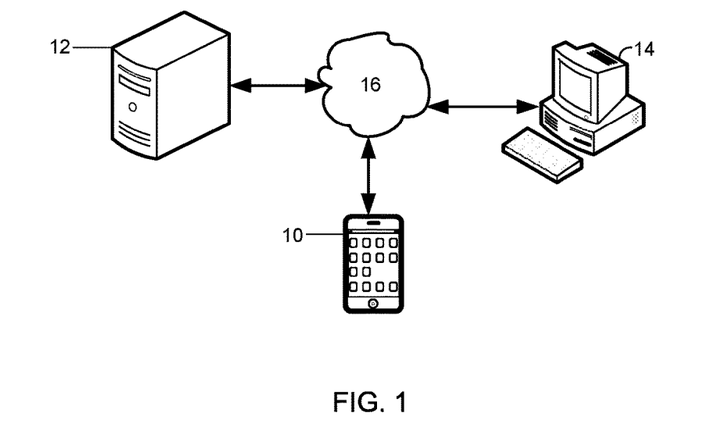
FIG. 1 is a schematic diagram of an example computing system for enhancing liveness detection of image data according to an embodiment of the present disclosure.

FIG. 1 is a schematic diagram of an example computing system 100 for enhancing liveness detection of image data according to an embodiment of the present disclosure. As shown in FIG. 1, the main elements of the system 100 include an electronic device 10, a server 12, and a computer 14 communicatively connected via a network 16.

In FIG. 1, the electronic device 10 can be any electronic device capable of at least downloading applications over the Internet, running applications, capturing and storing data temporarily and/or permanently, and otherwise performing any and all functions, methods and/or algorithms described herein by any computer, computer system, server or electronic device that may be included in the system 100. Examples of the electronic device 10 include, but are not limited to, a cellular phone, any wireless hand-held consumer electronic device, a smart phone, a tablet computer, a phablet computer, a laptop computer, and a personal computer (PC). Moreover, the electronic device 10 may be any type of server or computer implemented as a network server or network computer.

The electronic device 10 is typically associated with a single person who operates the device. The person who is associated with and operates the electronic device 10 is referred to herein as a user.

The server 12 can be, for example, any type of server or computer implemented as a network server or network computer. The computer 14 may be a personal computer (PC). The server 12 and computer 14 are electronic devices so each may be alternatively referred to as such. Additionally, the electronic device 10, the server 12, and the computer 14 may each alternatively be referred to as an information system.

The network 16 may be implemented as a 5G communications network. Alternatively, the network 16 may be implemented as any wireless network including, but not limited to, 4G, 3G, Wi-Fi, Global System for Mobile (GSM), Enhanced Data for GSM Evolution (EDGE), and any combination of a LAN, a wide area network (WAN) and the Internet. The network 16 may also be any type of wired network or a combination of wired and wireless networks.

It is contemplated by the present disclosure that the number of electronic devices server 12, and computer 14 is not limited to the number shown in the system 100. Rather, any number of electronic devices 10, servers 12, and computers 14 may be included in the system 100.

Figure 2:
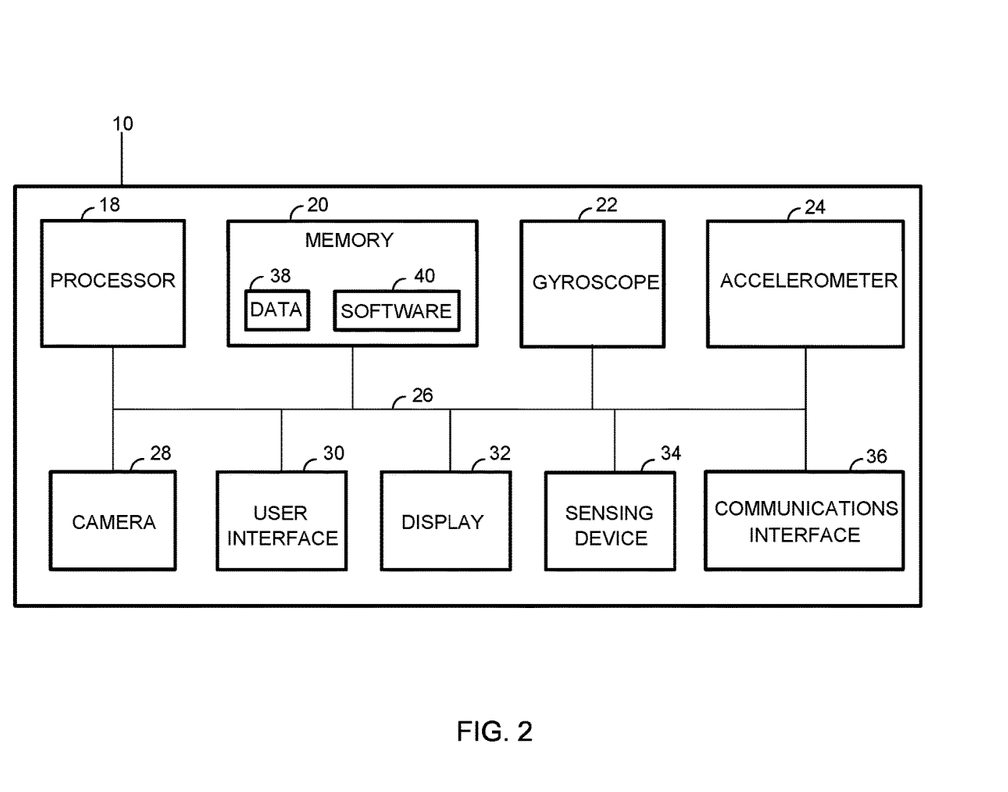
FIG. 2 is a more detailed schematic diagram of an example electronic device included in the system shown in FIG. 1.

FIG. 2 is a more detailed schematic diagram of the electronic device 10 for enhancing liveness detection of image data according to an embodiment of the present disclosure. The electronic device 10 includes components such as, but not limited to, one or more processors 18, a memory 20, a gyroscope 22, an accelerometer 24, a bus 26, a camera 28, a user interface 30, a display 32, a sensing device 34, and a communications interface 36. General communication between the components in the computing device 10 is provided via the bus 26.

The electronic device 10 can be any electronic device capable of at least downloading applications over the Internet, running applications, capturing and storing data temporarily and/or permanently, and otherwise performing any and all functions, methods and/or algorithms described herein by any computer, computer system, server or electronic device that may be included in the system 100. Examples of the electronic device 10 include, but are not limited to, a cellular phone, any wireless hand-held consumer electronic device, a smart phone, a tablet computer, a phablet computer, a laptop computer, and a personal computer (PC). Moreover, the electronic device 10 may be any type of server or computer implemented as a network server or network computer.

The processor 18 executes software instructions, or computer programs, stored in the memory 20. As used herein, the term processor is not limited to just those integrated circuits referred to in the art as a processor, but broadly refers to a computer, a microcontroller, a microcomputer, a programmable logic controller, an application specific integrated circuit, and any other programmable circuit capable of executing at least a portion of the functions and/or methods described herein. The above examples are not intended to limit in any way the definition and/or meaning of the term "processor."

The memory 20 may be any non-transitory computer-readable recording medium. Non-transitory computer-readable recording media may be any tangible computer-based device implemented in any method or technology for short-term and long-term storage of information or data. Moreover, the non-transitory computer-readable recording media may be implemented using any appropriate combination of alterable, volatile or non-volatile memory or non-alterable, or fixed, memory. The alterable memory, whether volatile or non-volatile, can be implemented using any one or more of static or dynamic RAM (Random Access Memory), a floppy disc and disc drive, a writeable or re-writeable optical disc and disc drive, a hard drive, flash memory or the like. Similarly, the non-alterable or fixed memory can be implemented using any one or more of ROM (Read-Only Memory), PROM (Programmable Read-Only Memory), EPROM (Erasable Programmable Read-Only Memory), EEPROM (Electrically Erasable Programmable Read-Only Memory), and disc drive or the like. Furthermore, the non-transitory computer-readable recording media may be implemented as smart cards, SIMs, any type of physical and/or virtual storage, or any other digital source such as a network or the Internet from which computer programs, applications or executable instructions can be read.

The memory 20 may be used to store any type of data 38, such as, but not limited to, data for training machine learning algorithms to detect liveness of image data, frequency maps, sets of similarity score calculation parameters, and threshold values. A frequency map represents a distribution of data for multiple distinct frequency ranges associated with an image data taken of a person. The frequency maps can include regions of interest in captured facial image data and frequency ranges assigned to each region of interest.

The data for each person can be stored in a data record. The data records are typically for users associated with the electronic device 10 and are stored in the memory 20. The data record for each user may include biometric modality data, biometric templates, frequency maps, and weight parameters.

Biometric modalities include, but are not limited to, voice, face, finger, iris, palm, and any combination of these or other modalities. Biometric modality data is the data of a biometric modality of a person that may be captured by the electronic device 10. As used herein, capture means to record temporarily or permanently biometric modality data of a person. Biometric modality data may be recorded in any form including, but not limited to, image data and audio data. Image data may be a digital image, a sequence of digital images, or a video. The biometric modality data in the data record may be processed to generate at least one biometric modality template.

The process of authenticating the identity of a user is known as an authentication transaction. Typically, during an authentication transaction a biometric template is generated from biometric modality data of a user captured during the transaction. The generated biometric template is compared against the corresponding record biometric template of the user and a matching score is calculated for the comparison. If the matching score meets or exceeds a threshold value, the identity of the user is verified as true. Alternatively, the captured user biometric modality data may be compared against the corresponding record biometric modality data to authenticate the identity of the user.

An authentication data requirement is the biometric modality data desired to be captured during an authentication or identification transaction. For the example methods described herein, the authentication data requirement is for the face of the user. However, the authentication data requirement may alternatively be for any biometric modality or any combination of biometric modalities.

Biometric modality data may be captured in any manner. For face biometric data, the camera 28 may record image data of the face of a user by taking one or more photographs or digital images of the user, or by taking a video of the user. The camera 22 may record a sequence of digital images at irregular or regular intervals. A video is an example of a sequence of digital images being captured at a regular interval. Captured biometric modality data may be temporarily or permanently stored in the electronic device 10 or in any device capable of communicating with the electronic device 10. Alternatively, the biometric modality data may not be stored.

The memory 20 can also be used to store any type of software 40. As used herein, the terms "software" and "computer program" are intended to encompass an executable program that exists permanently or temporarily on any non-transitory computer-readable recordable medium that causes the electronic device 10 to perform at least a portion of the functions, methods, and/or algorithms described herein. Application programs are software and include, but are not limited to, operating systems, Internet browser applications, applications that detect liveness of image data, user authentication applications, machine learning algorithms, applications that use pre-trained models based on machine learning algorithms, trained machine learning models, convolutional neural networks, computer programs for implementing octave convolution, computer programs for implementing multi-resolution convolution, and any other software and/or any type of instructions associated with algorithms, processes, or operations for controlling the general functions and operations of the electronic device 10. The software may also include computer programs that implement buffers and use RAM to store temporary data.

Authentication applications enable the electronic device 10 to conduct user authentication and identification (1:N) transactions with any type of authentication data, where "N" is a number of candidates. Machine learning algorithm applications include at least classifiers and regressors. Examples of machine learning algorithms include, but are not limited to, support vector machine learning algorithms, decision tree classifiers, linear discriminant analysis learning algorithms, and artificial neural network learning algorithms. Decision tree classifiers include, but are not limited to, random forest algorithms.

Machine learning models have parameters that are modified during training to optimize functionality of the models trained using a machine learning algorithm (MLA). A machine learning model (MLM) for enhancing liveness detection of image data may be trained using a machine learning algorithm (MLA). Such machine learning models are typically implemented as neural networks including, but not limited to, Xception, VGG19, EfficientNet B0 to B7, VGG16, ResNet, ResNetV2, MobileNet, MobileNetV2, MobileNetV3, DenseNet, NasNetLarge, NasNetMobile, InceptionV3 and InceptionResNetV2.

The gyroscope 22 and the one or more accelerometers 24 generate data regarding rotation and translation of the electronic device 10 that may be communicated to the processor 18 and the memory 20 via the bus 26. The electronic device 10 may alternatively not include the gyroscope 22 or the accelerometer 24 or may not include either.

The camera 28 captures image data. The camera 28 can be one or more imaging devices configured to record image data of at least a portion of the body of a user including any biometric modality of the user while utilizing the electronic device 10. Moreover, the camera 28 is capable of recording image data under any lighting conditions including infrared light. The camera 28 may be integrated into the electronic device 10 as one or more front-facing cameras and/or one or more rear facing cameras that each incorporates a sensor, for example and without limitation, a CCD or CMOS sensor. Alternatively, the camera 28 can be external to the electronic device 10.

The user interface 30 and the display 32 allow interaction between a user and the electronic device 10. The display 32 may include a visual display or monitor that displays information. For example, the display 32 may be a Liquid Crystal Display (LCD), an active matrix display, plasma display, or cathode ray tube (CRT). The user interface 30 may include a keypad, a camera, a keyboard, a mouse, an illuminator, a signal emitter, a microphone, and/or speakers.

Moreover, the user interface 30 and the display 32 may be integrated into a touch screen display. Accordingly, the display may also be used to show a graphical user interface, which can display various data and provide "forms" that include fields that allow for the entry of information by the user. Touching the screen at locations corresponding to the display of a graphical user interface allows the person to interact with the electronic device 10 to enter data, change settings, control functions, etc. Consequently, when the touch screen is touched, the user interface 30 communicates this change to the processor 18, and settings can be changed or user entered information can be captured and stored in the memory 20.

The sensing device 34 may include Radio Frequency Identification (RFID) components or systems for receiving information from other devices (not shown) and for transmitting information to other devices. The sensing device 34 may alternatively, or additionally, include components with Bluetooth, Near Field Communication (NFC), Zigbee communication protocol, infrared, or other similar capabilities. Communications between the electronic device 10 and other devices (not shown) may occur via NFC, RFID, Bluetooth or the like only so a network connection from the electronic device 10 is unnecessary.

When the user interface 30 includes an infrared illuminator and one or more cameras, the infrared illuminator may project infrared light or near infrared light on a biometric modality of a user, and the one or more cameras may detect reflections of the projected light off the biometric modality. The reflections may be off of any number of points on the biometric modality. The detected reflections may be communicated as reflection data to the processor 18 and the memory 20. The processor 18 may use the reflection data to create at least a three-dimensional model of the biometric modality and a sequence of two-dimensional digital images. For example, the reflections from at least thirty thousand discrete points on the biometric modality may be detected and used to create a three-dimensional model of the biometric modality.

The communications interface 36 may include various network cards, and circuitry implemented in software and/or hardware to enable wired and/or wireless communications with other devices (not shown). Communications include, for example, conducting cellular telephone calls and accessing the Internet over a network. By way of example, the communications interface 36 may be a digital subscriber line (DSL) card or modem, an integrated services digital network (ISDN) card, a cable modem, or a telephone modem to provide a data communication connection to a corresponding type of telephone line. As another example, the communications interface 36 may be a local area network (LAN) card (e.g., for Ethernet.TM. or an Asynchronous Transfer Model (ATM) network) to provide a data communication connection to a compatible LAN. As yet another example, the communications interface 36 may be a wire or a cable connecting the electronic device 10 with a LAN, or with accessories such as, but not limited to, other electronic devices. Further, the communications interface 36 may include peripheral interface devices, such as a Universal Serial Bus (USB) interface, a PCMCIA (Personal Computer Memory Card International Association) interface, and the like.

The communications interface 36 also allows the exchange of information across a network between the electronic device 10 and any other device (not shown) in the system 100. The exchange of information may involve the transmission of radio frequency (RF) signals through an antenna (not shown).

The server 12 and computer 14 may include similar components as described herein with regard to the electronic device 10. However, the server 12 and computer 14 typically would not include a gyroscope and/or an accelerometer.

Figure 3:
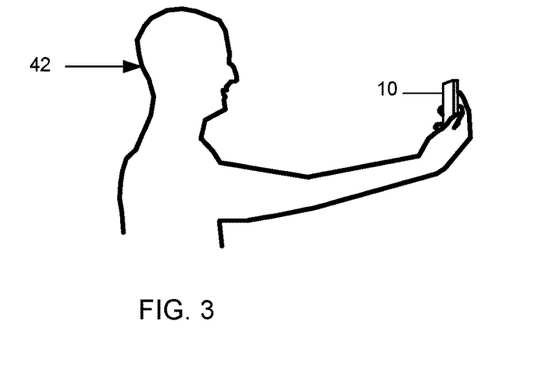
FIG. 3 is a side view of a user operating the example electronic device.

FIG. 3 is a side view of a user 42 operating the electronic device 10 during enrollment or during an authentication transaction. Specifically, the electronic device 10 and the user 42 are positioned relative to each other such that the user may operate the electronic device to capture facial image data from his or her self. Alternatively, a person other than the user may operate the electronic device 10 while the electronic device 10 captures facial image data of the user.

Figure 4:
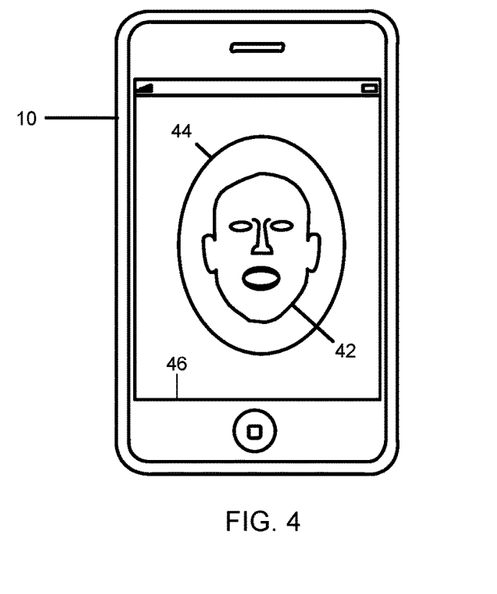
FIG. 4 is a front view of the example electronic device displaying an example visual aid and a facial image of the user positioned within the visual aid.

FIG. 4 is a front view of the electronic device 10 displaying an example visual aid 44 and a facial image of the user 42 positioned within the visual aid 44. The visual aid 44 may be displayed by the electronic device 10 and functions as a guide that enables users to capture data usable for enhancing the accuracy of user liveness determinations and generating trustworthy authentication transaction results. One example of the visual aid 44 is an oval. Other examples of the visual aid 44 include, but are not limited to, a circle, a square, a rectangle, and an outline of the head of the user. Moreover, the visual aid 44 may be any shape defined by lines and/or curves. However, it is not necessary that the visual aid 44 be displayed by the electronic device 10. The visual aid 44 may alternatively be a part of the electronic device 10 itself. For example, the visual aid 44 may be a perimeter 46 of the electronic device 10 display screen.

The displayed image of the user 42 is to be positioned within the visual aid 44 while capturing biometric data of the user with the electronic device 10. The displayed image may be close to the visual aid 44 border but not outside the border. Staying within the visual aid 44 facilitates taking image data usable for enhancing the accuracy of user liveness determinations and generating trustworthy authentication transaction results. Alternatively, a small percentage of the facial image may be allowed to extend beyond the border of the visual aid 44 so long as liveness detection of image data can be enhanced as described herein.

Figure 5:
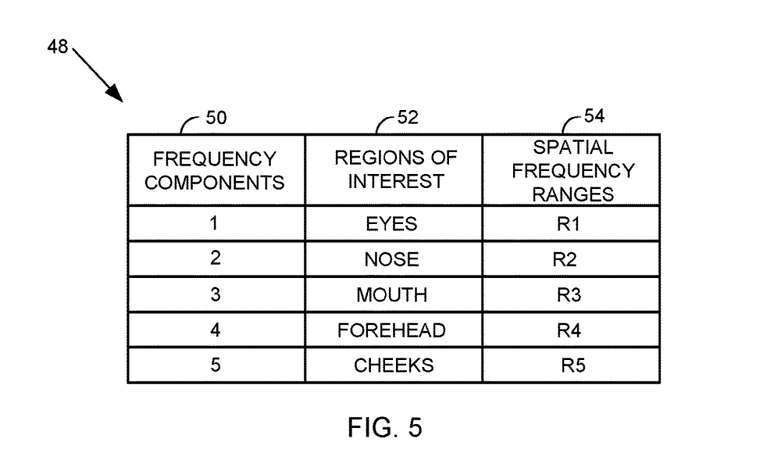
FIG. 5 is a diagram illustrating an example frequency map.

FIG. 5 is a diagram illustrating an example frequency map 48. The frequency map 48 is typically associated with a unique person and may be stored in the electronic device 10 or any device in the system 100 capable of communicating with the electronic device 10 via the network 16. The frequency map 48 represents a distribution of data for multiple distinct frequency ranges associated with image data of a person. A person may be associated with any number of the same or different frequency maps.

The frequency map 48 includes frequency components 50. Each frequency component 50 includes a region of interest 52 and a spatial frequency range 54 is assigned to each region of interest 52. There are five frequency components 50. However, it is contemplated by the present disclosure that any number of frequency components 50 may be included in the frequency map 48.

Different areas within facial image data of a user may include data that facilitates enhancing liveness detection more than other areas of the facial image data. These areas are referred to herein as regions of interest 52. Example regions of interest 52 for facial image data include, but are not limited to, the eyes, nose, mouth, forehead, and cheeks. Each frequency component typically includes a different region of interest 52.

Different regions of interest 52 may exhibit distinct frequency characteristics. This means that certain regions of interest 52 may contain information that is best analyzed or authenticated using specific spatial frequency ranges 54. The spatial frequency ranges 54 assigned to the regions of interest 52 including the eyes, nose, mouth forehead, and chin are R1, R2, R3, R4, and R5, respectively. It is contemplated by the present disclosure that the spatial frequency ranges 54 may be numerical, for example, amplitudes, or may generally describe the frequency as, for example, high or low.

By assigning different spatial frequency ranges 54 to each region of interest 52 within facial image data of a person, unique frequency information present in different parts of the facial image data can be effectively captured and processed. This allows conducting a more detailed analysis and authentication based on the facial image data, taking into account the specific frequency characteristics associated with each region of interest.

A weight parameter may be assigned to each region of interest 52 to prioritize certain regions of interest 52 over others, for example, when computing similarity scores for image data. The weight parameters assigned to the eyes, nose, mouth, forehead, and cheeks can be, for example, w_1, w_2, w_3, w_4, and w_5, respectively. While determining whether image data was taken of a live person, the weight parameters assigned to each region of interest 52 can be used to compute a similarity score. The weight parameters may be included in the frequency map 48. It is contemplated by the present disclosure that a frequency map may be created for each region of interest 52 within facial image data, or for the entire facial image data.

Each combination of region of interest 52 and spatial frequency range 54 constitutes a frequency component 50. Some frequency components 50 are more useful than others for determining whether image data was taken of a live person. A frequency component may be determined to be useful based on its ability to capture relevant information for detecting image data liveness. As a result, instead of including all the frequency components 50 for a user, it is contemplated by the present disclosure that frequency maps 48 for each user may include only those frequency components 50 deemed most useful for determining whether facial image data was taken of a live person.

Frequency components having high and low spatial frequency ranges 54 are useful for detecting image data liveness so are included in the frequency map 48. Extracted frequency components having high and low spatial frequency ranges 54 that consistently demonstrate significant variations or distinctive patterns between genuine and fraudulent images are considered useful.

The regions of interest 52 and assigned spatial frequency ranges 54 constitute data in frequency maps 48 that may be used to enhance detecting liveness of image data as described herein.

Image data of a person can include information that occurs at a low frequency and different information that occurs at a high frequency. Information that occurs at the low frequency is generally associated with smooth variations within an image and typically represent broader structures. Information that occurs at a low frequency includes, but is not limited to, general face shape and contours, the forehead, facial symmetry and proportions, shadows and shading across the face, skin tone and color variations. Low frequency information may also include broad facial features, for example, the nose, cheeks and chin. Lower frequency information occurs within a lower spatial frequency range than higher frequency information.

Information that occurs at a high frequency includes fine details and sharp transitions in the facial image data such as, but not limited to, fine lines and wrinkles, individual hair strands, eyelashes, lip texture, and texture details. Texture details can include skin pores and freckles. Higher frequency information occurs within a higher spatial frequency range than the low frequency information.

The low frequency information is extracted from facial image data using a low-pass filter, while the high frequency information is extracted from the image data using a high-pass filter. The low frequency information may be extracted by, for example, a low pass Gaussian filter. Low pass Gaussian filters are used in signal processing and image processing to reduce high-frequency noise, or details, in an image. Gaussian filters allow low-frequency components or smooth variations in the image data to pass through the filter while attenuating high-frequency components or sharp transitions.

The Gaussian filter is based on the Gaussian distribution, which is a bell-shaped curve, and convolves captured image data with a Gaussian window. The window is a two-dimensional matrix of values derived from the Gaussian function. Higher weights are assigned to the central pixels and the weights gradually decrease as the distance from the center increases, following the shape of the Gaussian distribution. When the low pass Gaussian filter is applied to image data of a person, the high-frequency details are blurred and the low-frequency components are retained resulting in a smoother version of the original image data. This filter is commonly used in various applications such as image denoising, edge detection, and feature extraction.

The high frequency information may be extracted by, for example, a high pass Laplacian filter which is a type of image filter used in signal processing and image processing to enhance high-frequency details or edges in an image. The Laplacian filter is a second-order derivative filter that emphasizes areas of rapid intensity changes in an image, such as edges or corners. It calculates a Laplacian operator on the image, which measures the rate of change of intensity at each pixel location. Positive values indicate bright-to-dark transitions which are typically indicative of edges and negative values indicate dark-to-bright transitions. The Laplacian filter is applied to image data after the Gaussian filter. As a result, the resulting image data enhances the high frequency details or edges by subtracting the smoothed version from the original image. High-pass Laplacian filters are commonly used for edge detection, image sharpening and feature enhancement. As a result, such filters facilitate enhancing fine details and cause edges to be more prominent.

In the context of determining whether or not image data was taken of a live person, the present disclosure contemplates the utilization of High-pass Laplacian filters and low pass Gaussian filters to identify fraudulent image data rendered from sources such as computer screens, color copies, or simple laminated pictures. By applying high and low frequency filters to image data of a person, certain characteristics or features that indicate the presence of screen edges or the edges of a photograph or paper can be detected. Filtered image data that does not exhibit these features is considered to have been taken of a live person and is thus considered genuine. Conversely, image data that exhibits these features is not considered to have been taken of a live person and is thus considered fraudulent. Using high and low frequency filters as described herein aids in distinguishing between genuine and fraudulent image data.

The spatial frequency ranges 54 can affect the mapping of facial features in image data to high and low frequencies. For example, the specific range of frequencies selected for high and low components can vary. Higher frequencies typically capture fine details, while lower frequencies represent broader structures.

Filter characteristics may also affect the mapping because the characteristics of the filters used for frequency extraction can influence the assignment of facial features. For example, the cutoff frequencies and roll-off characteristics of high-pass and low-pass filters can determine the separation between high and low-frequency components.

The resolution of captured image data may also affect the mapping because the resolution can impact the distribution of frequencies across facial features. Higher resolution images may allow for finer frequency analysis, capturing more detailed features in higher frequency components.

The significance of certain facial features in liveness detection can also guide the mapping. Features like texture details, wrinkles, or fine lines may be considered more important in high-frequency analysis, while overall face structure and symmetry may be emphasized in low-frequency analysis.

The intended application or specific requirements for detecting liveness of image data can influence the choice of frequency ranges 54. Factors such as lighting conditions, image quality, and the desired level of sensitivity to liveness cues can guide the selection of appropriate spatial frequency ranges 54.

Algorithm parameters can also affect the mapping of facial features to high and low frequencies in liveness detection. For example, Octave convolution techniques involve parameters such as octave scales, number of octaves, and octave overlap. These parameters affect the frequency bands extracted from the image data, influencing the assignment of facial features to high and low frequencies. Additionally, multi-resolution convolution techniques involve parameters like filter sizes and levels of decomposition. These parameters determine the frequency resolution at different scales and influence the distribution of facial features across frequency components. Moreover, the thresholds used to determine the matching criteria between frequency components and frequency maps can impact the assignment of features. Setting appropriate thresholds based on the application requirements and the expected range of similarity scores facilitates accurate feature mapping.

The characteristics of the filters used for frequency analysis, such as their kernel sizes or filter types (e.g., Gaussian, Laplacian, etc.), can affect the distribution of features across frequency bands. Different filters have distinct frequency response characteristics, which influence the assignment of facial features. If feature detection algorithms are employed as part of the liveness detection process, parameters such as feature point detection thresholds or feature matching criteria can influence the frequency mapping of specific facial landmarks or key points. When machine learning techniques are used, factors like training data, regularization parameters, or optimization algorithms can impact the learned representation and subsequent feature mapping.

Service providers typically require individuals to upload an image of his or her self and a claim of identity to facilitate authenticating the individual's identity before allowing the individual to conduct a desired network-based transaction. The uploaded images are typically analyzed to determine whether the images were taken of a live person and to authenticate the individual's identity. Imposters have been known to impersonate individuals by providing a false claim of identity supported by fraudulently obtained images when attempting to deceive a service provider into concluding the imposter is the person he or she claims to be. For facial biometric data imposters have been known to obtain two-dimensional pictures of others, from social networking sites, which can be presented to a camera during authentication to support a false claim of identity. Moreover, imposters have been known to eavesdrop on networks during legitimate network-based biometric authentication transactions to surreptitiously obtain genuine biometric data of users. The imposters then use the obtained biometric data for playback during fraudulent network-based authentication transactions. Such fraudulent biometric data are known to be difficult to detect using known liveness detection methods.

Liveness detection methods have been known to use structure derived from motion of a biometric modality, such as a person's face, to distinguish a live person from a photograph. Other methods have been known to analyze sequential images of eyes to detect eye blinks and thus determine if an image of a face is from a live person. Yet other known methods have been known to illuminate a biometric modality with a pattern to distinguish a live person from a photograph. However, these known methods may not be convenient and may not accurately detect spoofing. As a result, these known methods may not provide high confidence liveness detection support for service providers dependent upon accurate biometric authentication transaction results.

To address these problems liveness detection for image data of a person may be enhanced by receiving, by an electronic device, image data of a person, and using multi-resolution convolution and octave convolution techniques to extract first and second frequency components from the received image data. The first and second frequency components correspond to different spatial frequency ranges. The first frequency component may be compared against data in a first frequency map, wherein the first frequency map is generated from genuine image data of the person and the data includes the same spatial frequency range as the first frequency component. The second frequency component may be compared against data in a second frequency map, wherein the second frequency map is generated from genuine image data of the person and the data includes the same spatial frequency range as the second frequency component. Whether the first frequency component satisfies matching criteria with data in the first frequency map can be determined and whether the second frequency component satisfies matching criteria with data in the second frequency map can be determined. In response to determining the first and second frequency components fail to satisfy the data in the respective frequency map, it can be concluded that the received image data was not taken of a live person.

Figure 6:
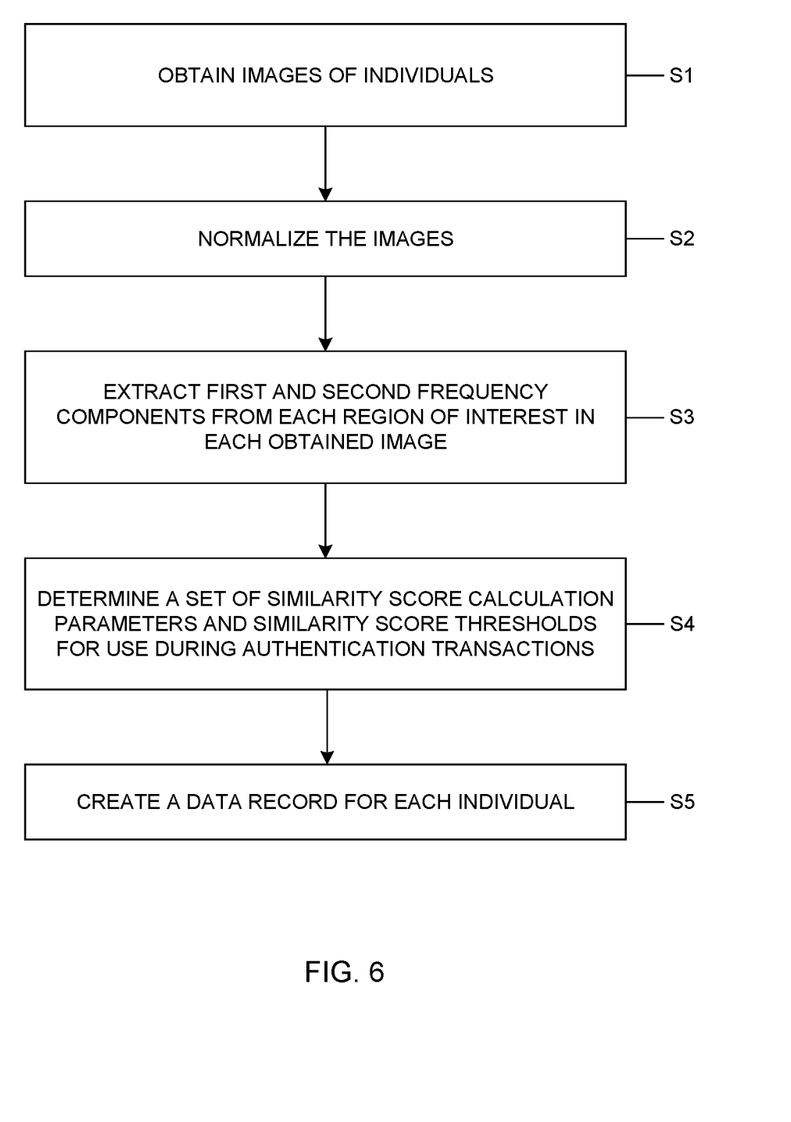
FIG. 6 is a flowchart illustrating an example method and algorithm for training a machine learning model to enhance detecting liveness of image data according to an embodiment of the present disclosure.

FIG. 6 is a flowchart illustrating an example method and algorithm for training a machine learning model to enhance liveness detection of image data according to an embodiment of the present disclosure. FIG. 6 illustrates example steps performed when the electronic device 10 runs software 40 stored in the memory 20 to train a model for enhancing liveness detection of image data.

In step S1, the software 40 executed by the processor 18 causes the electronic device 10 to obtain genuine and fraudulent images of individuals. The electronic device 10 may capture images of the individuals using, for example, the camera 28 or may receive images of the individuals from any other electronic device or information system in the system 100. The obtained images for each individual include a facial image. Additionally, or alternatively, the obtained images may include image data of any biometric modality including, but not limited to, palm and fingerprint.

In step S2, the software 40 executed by the processor 18 causes the electronic device 10 to crop and normalize each image. The images may be cropped to include facial image data only and normalized to manipulate the facial image data into a size and orientation for proper analysis. Normalizing the image data includes, but is not limited to, rotating, scaling, de-skewing, and perhaps correcting the facial image data for lighting caused by shadow, blur, and glare. The facial image data may also be processed to remove noise and to adjust for contrast.

Next, in step S3, the software 40 executed by the processor 18 causes the electronic device 10 to extract first and second frequency components from each region of interest in each obtained image. More specifically, the electronic device 10 uses frequency analysis techniques to extract frequency components from the facial image data of each obtained image. Doing so involves decomposing the facial image data of each obtained image into multiple scale or frequency bands. Frequency analysis techniques that may be used include a combination of octave convolution and multi-resolution convolution techniques. Additionally, the electronic device 10 filters the extracted frequency components to isolate desired information, for example, high and low frequency components included in the extracted frequency components. The electronic device 10 can use, for example, a low-pass Gaussian filter to extract the low frequency components and a high-pass Laplacian filter to extract the high frequency components from the extracted frequency components.

In step S4, the software 40 executed by the processor 18 causes the electronic device 10 to determine a set of similarity score calculation parameters and similarity score thresholds for use during identity authentication transactions. Techniques such as gradient descent may be used to optimize the similarity score calculation parameters. The set of similarity score calculation parameters may be used to compute a similarity score for each obtained image while evaluating the authenticity of the obtained image. The similarity score calculation parameters can be determined on either an obtained image basis or a region of interest (ROI) basis.

High and low frequency components that are useful for detecting image data liveness are included in the frequency map. A frequency component is determined to be useful based on its ability to capture relevant information for detecting image data liveness. Extracted high and low frequency components that consistently demonstrate significant variations or distinctive patterns between genuine and fraudulent documents are considered useful.

The software 40 executed by the processor 18 also causes the electronic device 10 to identify features in each obtained image including, but not limited to, regions of interest 52 and corresponding frequency ranges 54.

Next, in step S5, when the criteria defining the end of training have been satisfied, training is complete and the software 40 executed by the processor 18 causes the electronic device 10 to create a data record for each individual for whom image data was obtained. The created data record includes data such as, but not limited to, the obtained image, regions of interest 52, frequency ranges 54 and weight parameters. The regions of interest 52 and corresponding frequency ranges 54 may be stored in the data record as a record frequency map. Moreover, when the criteria defining the end of training have been satisfied, the trained machine learning model can be deemed operable to enhance liveness detection of image data.

Any number of obtained images may be used for training the machine learning algorithm that facilitates creating a model capable of enhancing liveness detection of image data as described herein. Each obtained image may be entered into the machine learning algorithm being trained any number of times, for example, 100 times that facilitates training a model capable of enhancing liveness detection of image data.

Figure 7:
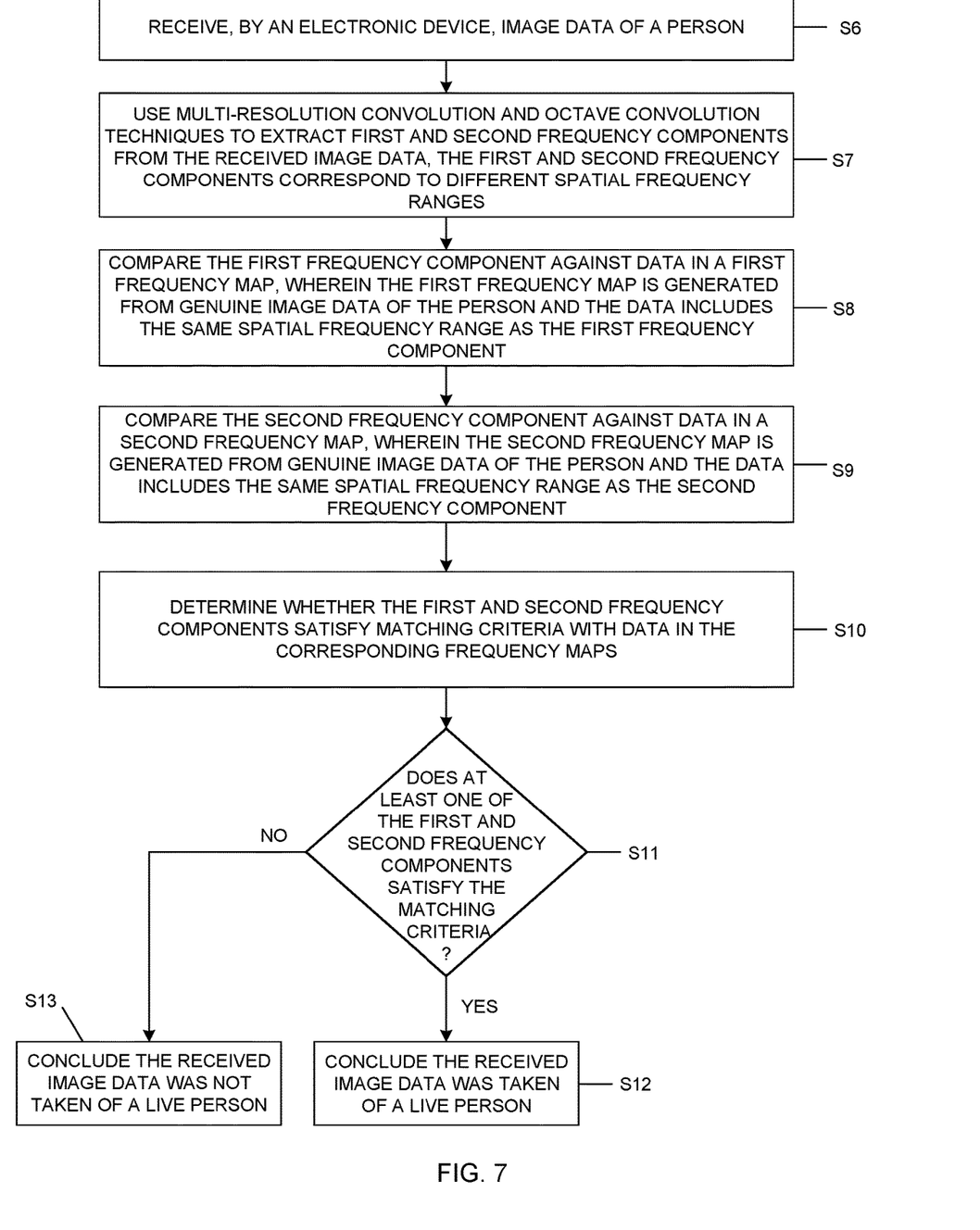
FIG. 7 is a flowchart illustrating an example method and algorithm for enhancing liveness detection of image data according to an embodiment of the present disclosure.

FIG. 7 is a flowchart illustrating an example method and algorithm for enhancing liveness detection of image data that may be implemented by a machine learning model, for example, as described herein with regard to the flowchart illustrated in FIG. 6. FIG. 7 illustrates example steps performed when the electronic device 10 runs software 40 stored in the memory 20 to enhance liveness detection of image data.

In step S6, the software 40 executed by the processor 18 causes the electronic device 10 to receive image data of a person. For example, the camera 28 may take a picture of the person such that the electronic device 10 receives image data. Taking a picture of the person may also be considered capturing image data of the person. Alternatively, the electronic device 10 may receive image data of the person from another electronic device, for example, the server 12 or computer 14 transmitted via the network 16. The received image data is facial image data of the person. The received image data may be cropped and normalized if necessary.

Next, in step S7, the software 40 executed by the processor 18 causes the electronic device 10 to use multi-resolution convolution and octave convolution techniques to extract first and second frequency components from the received image data. The first and second frequency components correspond to different spatial frequential ranges. The first frequency component can be a low frequency component while the second frequency component can be a high frequency component. The first and second frequency components can be extracted from any region of interest 52 of facial image data.

The electronic device 10 uses frequency analysis techniques to extract frequency components from the facial image data. Doing so involves decomposing the facial image data into multiple scale or frequency bands. Frequency analysis techniques that may be used include a combination of octave convolution and multi-resolution convolution techniques. Additionally, the electronic device 10 filters the extracted frequency components to isolate desired information, for example, high and low frequency ranges included in the extracted frequency components.

The facial image data includes information that occurs at a low frequency and different information that occurs at a high frequency. Information that occurs at the low frequency is generally associated with smooth variations within an image. Information that occurs at a low frequency includes, but is not limited to, general face shape and contours, the forehead, facial symmetry and proportions, shadows and shading across the face, skin tone and color variations. Low frequency information may also include broad facial features, for example, the nose, cheeks and chin. Lower frequency information occurs within a lower spatial frequency range than higher frequency information.

Information that occurs at a high frequency includes fine details and sharp transitions in the image data such as, but not limited to, fine lines and wrinkles, individual hair strands, eyelashes, lip texture, and texture details. Texture details can include skin pores and freckles. Higher frequency information occurs within a higher spatial frequency range than the low frequency information.

The low frequency information is extracted from the facial image data as the low frequency component using a low-pass filter, while the high frequency information is extracted from the facial image data as the high frequency component using a high-pass filter. The low frequency component may be extracted by, for example, a low pass Gaussian filter while the high frequency component may be extracted by, for example, a high pass Laplacian filter.

In step S8, the software 40 executed by the processor 18 causes the electronic device 10 to compare the first frequency component against the data in a first frequency map. The first frequency map is generated from genuine image data of the person and the data includes the same spatial frequency range as the first frequency component Likewise, in step S9, the software 40 executed by the processor 18 causes the electronic device 10 to compare the second frequency component against data in a second frequency map. The second frequency map is generated from genuine image data of the person and the data includes the same spatial frequency range as the second frequency component. The data in the first and second frequency maps may be a frequency component 50 including a region of interest 52 and corresponding frequency range 54.

Next, in step S10, the software 40 executed by the processor 18 causes the electronic device 10 to determine whether the first and second frequency components satisfy the matching criteria with data in their respective frequency maps. More specifically, the software executed by the processor 18 causes the electronic device 10 to calculate a similarity score for the comparison of the first frequency component against the first frequency map and a similarity score for the comparison of the second frequency component against the second frequency map.

Each similarity score is compared against a threshold value. When at least one of the similarity scores satisfies the threshold value, in step S11, the software 40 executed by the processor 18 causes the electronic device 10 to determine the matching criteria are satisfied. Next, in step S12, the software 40 executed by the processor 18 causes the electronic device 10 to conclude that the received image data was taken of a live person and is thus genuine.

However, if neither similarity score satisfies the threshold value, in step S11, the software 40 executed by the processor 18 causes the electronic device 10 to determine the matching criteria are not satisfied. Next, in step S13, the software 40 executed by the processor 18 causes the electronic device 10 to conclude that the received image data was not taken of a live person and is thus fraudulent.

The threshold value may be satisfied when a calculated similarity score is less than or equal to the threshold value. Other threshold values may be satisfied when the calculated similarity score is equal to or greater than the threshold value. Alternatively, the threshold value may include multiple threshold values, each of which is required to be satisfied to satisfy the threshold value.

Using first and second frequency components as described in the example method and algorithm for enhancing liveness detection of image data, generates sufficiently accurate and trustworthy liveness detection results. However, if more rigorous accuracy is desired, additional frequency components may be extracted and used to facilitate enhancing the accuracy of liveness detection results.

The information shown in FIG. 8 includes some of the same information shown in FIG. 7 as described in more detail below. As such, features illustrated in FIG. 8 that are identical to features illustrated in FIG. 7 are identified using the same reference numerals used in FIG. 7.

Figure 8:
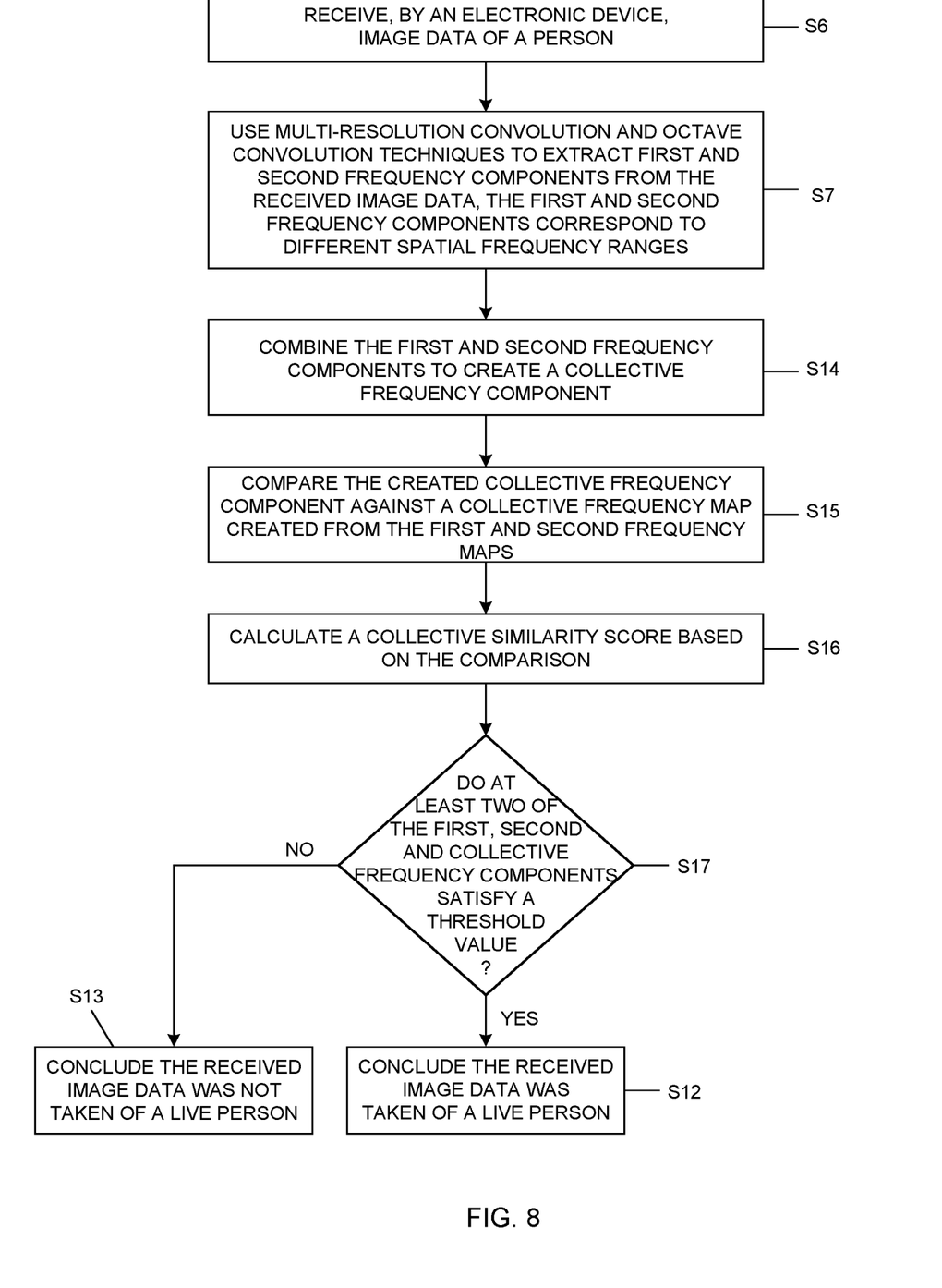
FIG. 8 is a flowchart illustrating another example method and algorithm for enhancing liveness detection of image data according to another embodiment of the present disclosure.

FIG. 8 is a flowchart illustrating another example method and algorithm for enhancing liveness detection of image data that may be implemented by a machine learning model, for example, the model as described herein with regard to the flowchart illustrated in FIG. 6. FIG. 8 illustrates example steps performed when the electronic device 10 runs software 40 stored in the memory 18 to enhance liveness detection of image data.

This method is similar to that shown in FIG. 7. However, after extracting, in step S7, the first and second frequency components from the received image data, in step S14, the software 40 executed by the processor 18 causes the electronic device 10 to combine the first and second frequency components to create a collective frequency component. The first and second frequency components may be combined by adding or multiplying the frequency ranges 54 of the components. The first and second frequency maps can be similarly combined to create a collective frequency map. The first and second frequency components should include the same region of interest 52 to create a collective frequency component.

Next, in step S15, the software 40 executed by the processor 18 causes the electronic device 10 to compare the collective frequency component against the collective frequency map. In step S16, the software 40 executed by the processor 18 causes the electronic device 10 to calculate a collective similarity score based on the comparison and to compare the collective similarity score against a threshold value. The similarity scores calculated for the first and second frequency components as described herein with regard to FIG. 7, and the collective similarity score may be used to determine whether the matching criteria are satisfied.

When at least two of the three similarity scores calculated for the first frequency component, the second frequency component and the collective frequency component satisfy the threshold value, in step S17, the software 40 executed by the processor 18 causes the electronic device 10 to determine that the matching criteria are satisfied. Next, in step S12, the software 40 executed by the processor 18 causes the electronic device 10 to conclude that the received image data was taken of a live person and is thus genuine.

However, if at least two of the similarity scores fail to satisfy the threshold value, in step S17, the software 40 executed by the processor 18 causes the electronic device 10 to determine that the matching criteria are not satisfied. Next, in step S13, the software 40 executed by the processor 18 causes the electronic device 10 to conclude that the captured image data was not taken of a live person and is thus fraudulent.

Although three similarity scores are calculated in the example method and algorithm, it should be understood that the number of calculated similarity scores depends on the number of extracted frequency components.

Using a collective frequency component as described herein facilitates reducing the time required for liveness detection when one similarity score strongly exceeds the threshold value and the other does not satisfy the threshold value. The similarity score of the collective frequency component reflects the strength of the one similarity score.

The extracted first frequency component includes low frequency information in the example methods and algorithms described herein. The low frequency information in the first frequency component may not resemble the corresponding information in a frequency map. For example, the low frequency image information may be of a basketball while the corresponding information in a frequency map is of a person's head. For this example, the calculated similarity score should strongly satisfy the threshold value such that a similarity score may not need to be calculated for high frequency image information. It is contemplated by the present disclosure that when the similarity score calculated for low frequency image information strongly satisfies the threshold value, a similarity score for the high frequency image information may not be calculated and the liveness detection result can be based on the low frequency image information only. Doing so facilitates reducing the time and costs associated with generating accurate and trustworthy liveness detection results. Exceeding the threshold value by at least fifty percent may be considered strongly satisfying the threshold value.

It should be understood that although the first frequency component includes low frequency image information as described herein, any extracted frequency component that includes low frequency image information may be used as the sole basis for detecting liveness of the image data.

Although the methods and algorithms described herein enhance liveness detection of image data based on spatial frequency components, it is contemplated by the present disclosure that the liveness of the image data may additionally, or alternatively, be detected using information in different regions of interest in the image data. For example, additional frequency component analyses could be performed on certain regions of interest such as around the eyes.

Using the methods and algorithms for enhancing liveness detection of image data as described herein enables efficiently capturing and representing information across different spatial scales, which provides a comprehensive evaluation regarding the genuineness of image data. Moreover, using the method and algorithms for enhancing liveness detection of image data as described herein enables detecting minute differences between authentic and forged images, thereby enhancing the accuracy and trustworthiness of liveness detection results. Furthermore, using the method and algorithms for enhancing liveness detection of image data as described herein enables adequately extracting features from image data, enables enhancing sensitivity to noise and variations in conditions during image capture, enables reducing computational efficiency, and facilitates satisfactory information exchange between different resolutions. In view of the above, it can be seen that the methods and algorithms facilitate enhancing the accuracy and trustworthiness of identity authentication transaction results while enhancing security and facilitating a reduction in costs incurred due to spoofing.

It is contemplated by the present disclosure that the example methods and algorithms described herein may be conducted entirely by the electronic device 10; partly by the electronic device 10 and partly by the server 12; partly by the electronic device 10, partly by the server 12 and partly by the computer 14; partly by the computer 14 and partly by the server 12; entirely by the computer 14; or, by any other combination of other servers (not shown), electronic devices (not shown), or computers (not shown) operable to communicate with the electronic device 10, the server 12, and the computer 14 via the network 16. Furthermore, data described herein as being stored in the electronic device 10 may alternatively, or additionally, be stored in any other server (not shown), electronic device (not shown), or computer (not shown) operable to communicate with the electronic device 10 via the network 16.

Additionally, the example methods and algorithms described herein may be implemented with any number and organization of computer program components. Thus, the methods and algorithms described herein are not limited to specific computer-executable instructions. Alternative example methods and algorithms may include different computer-executable instructions or components having more or less functionality than described herein.

The example methods and/or algorithms described above should not be considered to imply a fixed order for performing the method and/or algorithm steps. Rather, the method and/or algorithm steps may be performed in any order that is practicable, including simultaneous performance of at least some steps. Moreover, the method and/or algorithm steps may be performed in real time or in near real time. It should be understood that for any method and/or algorithm described herein, there can be additional, fewer, or alternative steps performed in similar or alternative orders, or in parallel, within the scope of the various embodiments, unless otherwise stated. Furthermore, the invention is not limited to the embodiments of the methods and/or algorithms described above in detail.

What is claimed is:

1. A method for enhancing liveness detection of image data comprising the steps of:
    receiving, by an electronic device, image data of a person;
    using multi-resolution convolution and octave convolution techniques to extract first and second frequency components from the received image data, the first and second frequency components correspond to different spatial frequency ranges;
    comparing the first frequency component against data in a first frequency map, wherein the first frequency map is generated from genuine image data of the person and the data includes the same spatial frequency range as the first frequency component;
    comparing the second frequency component against data in a second frequency map, wherein the second frequency map is generated from genuine image data of the person and the data includes the same spatial frequency range as the second frequency component;
    determining whether the first frequency component satisfies matching criteria with data in the first frequency map;
    determining whether the second frequency component satisfies matching criteria with data in the second frequency map; and in response to determining the first and second frequency components fail to satisfy the data in the respective frequency map, concluding the received image data was not taken of a live person.

2. The method according to claim 1, further comprising concluding the received image data was taken of a live person in response to determining at least one of the first and second frequency components satisfies the data in the respective frequency map.

3. The method according to claim 1, said determining whether the first and second frequency components satisfy matching criteria in the respective frequency map comprising:
   calculating a similarity score for the comparison of the first frequency component against the first frequency map and a similarity score for the comparison of the second frequency component against the second frequency map;
   comparing each similarity score against a threshold value; and
   determining at least one of the first and second frequency components satisfies the data in the respective frequency map when the corresponding similarity score satisfies the threshold value.

4. The method according to claim 3, further comprising:
   combining the first and second frequency components to create a collective frequency component;
   comparing the collective frequency component against a collective frequency map created from the first and second frequency maps;
   calculating a collective similarity score based on said comparing the collective frequency component step;
   determining whether the first frequency component, the second frequency component, and the collective frequency components satisfy a threshold value; and
   in response to determining that at least two of the first frequency component, the second frequency component and the collective frequency component satisfy the threshold value, concluding the received image data was taken of a live person.

5. The method according to claim 4, further comprising in response to determining that at least two of the first frequency component, the second frequency component and the collective frequency component fail to satisfy the threshold value, concluding the received image data was not taken of a live person.

6. The method according to claim 3, further comprising determining that at least one region of interest is in the received image data, the at least one region of interest being in the first frequency component only, wherein the first frequency component includes low frequency image information.

7. The method according to claim 6, said comparing the first and second frequency components against data in the first and second frequency maps step further comprising comparing the at least one region of interest against a corresponding at least one region of interest in the first frequency map.

8. The method according to claim 1, said determining whether the first and second frequency components satisfy the data in the respective frequency map step comprising:
   determining the received image data includes at least one region of interest, the at least one region of interest being included in the first and second frequency components;
   comparing the at least one region of interest in the first frequency component against a corresponding region of interest in the first frequency map; and
   comparing the at least one region of interest in the second frequency component against a corresponding region of interest in the second frequency map.

9. An electronic device for enhancing liveness detection of image comprising:
   a processor; and
   a memory configured to store data, said electronic device being associated with a network and said memory being in communication with said processor and having instructions stored thereon which, when read and executed by said processor, cause said electronic device to:
   receive image data of a person;
   use multi-resolution convolution and octave convolution techniques to extract first and second frequency components from the received image data, the first and second frequency components correspond to different spatial frequency ranges;
   compare the first frequency component against data in a first frequency map, wherein the first frequency map is generated from genuine image data of the person and the data includes the same spatial frequency range as the first frequency component;
   compare the second frequency component against data in a second frequency map, wherein the second frequency map is generated from genuine image data of the person and the data includes the same spatial frequency range as the second frequency component;
   determine whether the first frequency component satisfies matching criteria with data in the first frequency map;
   determine whether the second frequency component satisfies matching criteria with data in the second frequency map; and
   in response to determining the first and second frequency components fail to satisfy the data in the respective frequency map, conclude the received image data was not taken of a live person.

10. The electronic device according to claim 9, wherein the instructions when read and executed by said processor, cause said electronic device to conclude the received image data was taken of a live person in response to determining at least one of the first and second frequency components satisfies the data in the respective frequency maps.

11. The electronic device according to claim 9, wherein the instructions when read and executed by said processor, cause said electronic device to:
   calculate a similarity score for the comparison of the first frequency component against the first frequency map and a similarity score for the comparison of the second frequency component against the second frequency map;
   compare each similarity score against a threshold value; and
   determine at least one of the first and second frequency components satisfies the data in the respective frequency map when the corresponding similarity score satisfies the threshold value.

12. The electronic device according to claim 11, wherein the instructions when read and executed by said processor, cause said electronic device to:
   combine the first and second frequency components to create a collective frequency component;

compare the collective frequency component against a collective frequency map created from the first and second frequency maps;

calculate a collective similarity score based on the collective frequency component and collective frequency map comparison;

determine whether the first frequency component, the second frequency component, and the collective frequency components satisfy a threshold value; and in response to determining that at least two of the first frequency component, the second frequency component and the collective frequency component satisfy the threshold value, conclude the received image data was taken of a live person.

13. The electronic device according to claim 12, wherein the instructions when read and executed by said processor, cause said electronic device to conclude the received image data was not taken of a live person in response to determining that at least two of the first, second and collective frequency components fail to satisfy the threshold value.

14. The electronic device according to claim 11, wherein the instructions when read and executed by said processor, cause said electronic device to determine that at least one region of interest is in the received image data, the at least one region of interest being in the first frequency component only, wherein the first frequency component includes low frequency image information.

15. The electronic device according to claim 14, wherein the instructions when read and executed by said processor, cause said electronic device to compare the at least one region of interest against a corresponding at least one region of interest in the first frequency map.

16. The electronic device according to claim 9, wherein the instructions when read and executed by said processor, cause said electronic device to:

determine the received image data includes at least one region of interest, the region of interest being included in the first and second frequency components;

compare the at least one region of interest in the first frequency component against a corresponding region of interest in the first frequency map; and compare the at least one region of interest in the second frequency component against a corresponding region of interest in the second frequency map.

\* \* \* \* \*